Oct. 18, 1966  T. L. FAWICK  3,279,217
FLEXIBLE COUPLING

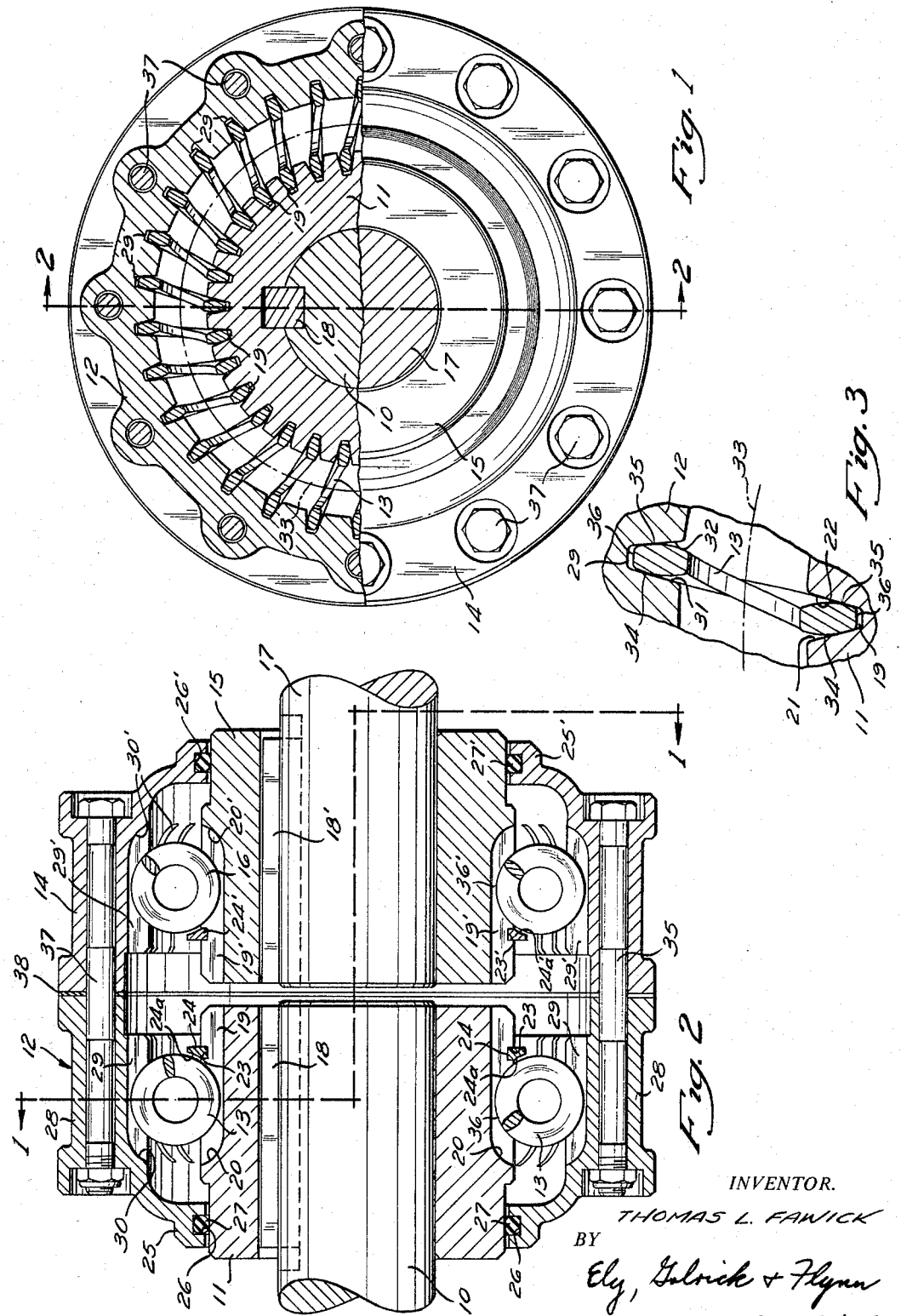

Filed Aug. 28, 1964   2 Sheets-Sheet 2

INVENTOR.
THOMAS L. FAWICK
BY
Ely, Golrick & Flynn
ATTORNEYS

United States Patent Office 3,279,217
Patented Oct. 18, 1966

3,279,217
FLEXIBLE COUPLING
Thomas L. Fawick, Shaker Heights, Ohio, assignor to
Fawick Corporation, a corporation of Michigan
Filed Aug. 28, 1964, Ser. No. 392,743
3 Claims. (Cl. 64—15)

This invention relates to a flexible coupling for transmitting torque between two rotatable members.

A principal object of this invention is to provide a novel and improved flexible coupling in which torque is transmitted through a resilient coil spring annulus.

Another object of this invention is to provide such a coupling in which the coil spring annulus has its turns engaged in grooves in concentrically disposed outer and inner coupling members for resiliently transmitting torque between them.

Another object of this invention is to provide such a coupling of novel construction which adapts it to carry heavy torque without damage to the coupling. Further objects and advantages of this invention will be apparent from the following detailed description of a presently-preferred embodiment thereof, which is illustrated in the accompanying drawings.

In the drawings:

FIGURE 1 is a view, partly in end elevation and partly in vertical section, taken along the line 1—1 in FIG. 2, showing a flexible coupling in accordance with the present invention;

FIGURE 2 is a vertical axial section taken along the line 2—2 in FIG. 1;

FIGURE 3 is an enlarged fragmentary vertical cross-section through one turn of the coil spring annulus and the grooves in the outer and inner coupling members which receive it, taken along a part of line 1—1 in FIG. 2 which is disposed along a radius of the coil spring annulus;

Figure 4:
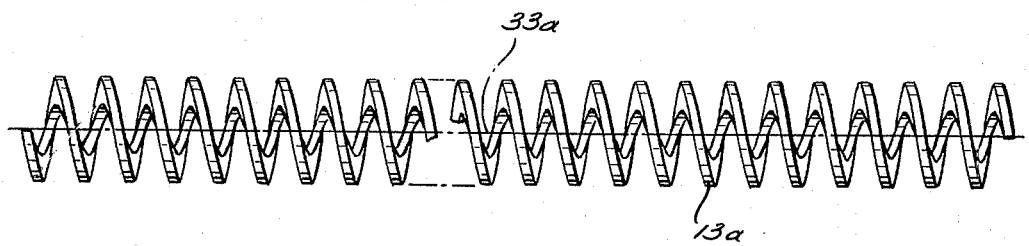
FIGURE 4 is a front elevational view, partly broken away, showing the coil spring in the present coupling before it is formed into an annulus for incorporation in the coupling.

Referring first to FIGURE 2, the assembly shown therein comprises a first rotatable shaft 10, a first inner coupling member 11 carried by shaft 10, a first outer coupling member 12 flexibly and resiliently coupled to the inner member 11 through a first coil spring annulus 13, a second outer coupling member 14 bolted end-to-end to the first outer coupling member 12, a second inner coupling member 15 resiliently coupled to the outer member 14 through a second coil spring annulus 16, and a second shaft 17 carrying the inner member 15 and extending coaxially away from the first shaft 10. Preferably, the first coupling assembly, composed of members 11, 12 and 13, and the second coupling assembly, composed of members 14, 15 and 16, are mirror images of one another. Either shaft 10 or 17 may be the driving shaft and the other the driven shaft.

As shown in FIG. 1, in the first coupling assembly the inner coupling member 11 is an externally toothed annular body coupled to shaft 10 by a longitudinal key 18 which rigidly imparts rotation between them. The inner coupling member 11 is of generally cylindrical cross-section and its external teeth are separated by a plurality of identical external grooves 19 evenly spaced apart in succession circumferentially about coupling member 11 and each extending helically along member 11 at a predetermined helix angle, with the centerline about which the helix extends coinciding with the conjoint rotational axes of shaft 10 and coupling member 11.

Each of these grooves 19 is open at the right end of the inner coupling member 11 in FIG. 2 and is of uniform depth from that end over its closed inner end 20 (to the left in FIG. 2). As shown in FIG. 3, each groove 19 has oppositely inclined, confronting opposite side walls 21 and 22 which converge toward one another toward the bottom of the groove. These opposite side walls of the grooves extend helically along the inner coupling member 11 at said predetermined helix angle.

Toward its right end in FIG. 2, the inner coupling member 11 has an external circumferential groove 23 which snugly receives a snap ring 24. Preferably, the snap ring has a curved axially inwardly disposed face 24a with a curvature corresponding substantially to that of the adjacent outer surfaces of the coil springs annulus 13.

The first outer coupling member 12 is disposed concentrically about the inner coupling member 11 and is of annular cup shape, presenting a reduced diameter left end 25 in FIG. 1 which closely surrounds the inner coupling member 11. At this end, the outer coupling member 12 has an internal circumferential groove 26 in which is seated a resilient, deformable O-ring 27 of rubber or rubber-like material, which sealingly engages the outside of the inner coupling member 11.

Away from its left end in FIG. 2, the outer coupling member 12 presents a larger diameter annular portion 28 which is substantially spaced radially from the inner coupling member 11. This larger diameter portion 28 of the outer coupling member 12 is internally toothed, presenting a plurality of identical internal grooves 29 evenly spaced apart in succession circumferentially of member 12 and each extending helically along member 12 at said predetermined helix angle, parallel to the external grooves 19 in the inner coupling member 11. The number of these internal grooves 29 in outer coupling member 12 is the same as the number of internal grooves 19 in inner coupling member 11, the former are spaced farther apart circumferentially in accordance with the larger radius of the inside of the outer coupling member 12 compared to that of the outside of the inner coupling member 11.

Each of these internal grooves 29 is open at the right end of the outer coupling member 12 in FIG. 2 and is of uniform depth from that end over to its closed inner end 30 (to the left in FIG. 2). These internal grooves 29 in the outer coupling member 12 preferably are coextensive longitudinally of the first coupling assembly with the external grooves 19 in the inner coupling member 11. As shown in FIG. 4, each groove 29 has oppositely inclined, confronting, opposite side walls 31 and 32 which converge toward one another toward the bottom of the groove. These opposite side walls of the grooves 29 extend helically along the outer coupling member 12 at said predetermined helix angle.

In accordance with the present invention, the inner and outer coupling members 11 and 12 are flexibly and resiliently interconnected by a coil spring annulus 13 of suitable resilient spring wire. Preferably, this annulus is made from an elongated spring wire helix 13a whose central helix axis 33a initially is straight, as shown in FIG. 4. This helix 13a then is formed into a circle, with its central helix axis now circular, as shown at 33 in FIG. 5, and the opposite ends of the helix are brazed or welded to each other to provide a continuous annulus 13 composed of interconnected, successive helical turns of the spring wire.

As shown in FIG. 3, the coil spring, when bent to its completed annular form, is of oblong cross-section, being substantially thicker radially than axially. About midway through its radial thickness, the spring wire has its maximum thickness in an axial direction, and on either side (radially) of this location its axial thickness is progressively smaller. At the outer half of its radial thickness, the spring wire of this annulus presents oppositely inclined, opposite side faces 34 and 35 which extend outwardly to its outer periphery edge 36 at substantially the same angular inclination as that of the opposite side walls 21 and 22 of the external grooves 19 in the inner coupling member 11 and that of the opposite side walls 31 and 32 of the internal grooves 29 in the outer coupling member 12.

Figure 5:
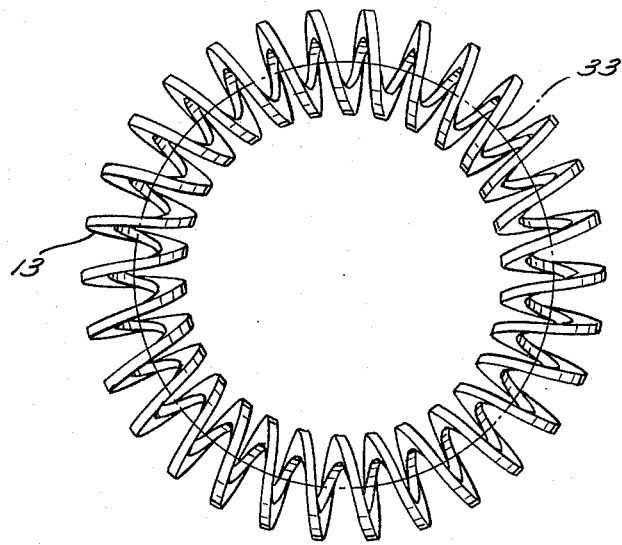
FIGURE 5 is a front elevational view of this coil spring after it has been formed into an annulus and its ends joined together.

Preferably, the coil spring annulus 13 is first assembled onto the inner coupling member 11 by sliding it endwise thereon and wedging its inside turns tightly into the external grooves 19 in the latter. The inside diameter of the coil spring annulus 13, as shown in FIG. 5, before it is applied to the inner coupling member 11 is such that it must be expanded radially in order to be applied. This insures that it will resiliently grip member 11 and will have a tight wedging fit thereon. Due to this tight wedging fit, the inside turns of the coil spring annulus have abutting engagement with the opposite side walls 21, 22 of the grooves over substantial side face areas of the inside turns. This promotes the effective transmission of torque between the inner coupling member 11 and the coil spring annulus 13 without undesirably high stress concentration at any localized areas of the latter's inside turns.

Following the assembly of the coil spring annulus 13 and the inner coupling member 11 to each other, the outer coupling member 12 is slipped endwise over the outside turns of the coil spring annulus 13. Preferably, these outside turns are snugly received in the internal grooves 29 in member 12, but a somewhat looser fit is permissible here compared to the tight wedging fit of the inside turns in the external grooves in the inner coupling member 11, because of the lower torque load on the outside turns due to the larger radius. In the event of axial misalignment in the coupling, the outside turns of the coil spring can roll slightly in the grooves 29 to accommodate such misalignment.

The outside peripheral edge 36 of the coil spring annulus is spaced from the bottom of each groove 19 in the inner coupling member 11 and each groove 29 in the outer coupling member 12 throughout its extent in each groove.

The snap ring 24 on the inner coupling member 11 positively prevents the coil spring annulus 13 from movement axially of the assembly out of engagement with the outer and inner coupling members 12 and 11.

The outer coupling member 12 in the first coupling assembly is rigidly connected end-to-end to the outer coupling member 14 in the second coupling assembly by a plurality of circumferentially spaced bolts 37.

As already stated, the second coupling assembly 14–16, is a mirror image of the first and hence a detailed description of its construction and mode of operation is unnecessary. Corresponding parts of the second coupling assembly are given the same reference numerals as the parts in the first coupling assembly, with a "prime" subscript added.

A gasket 38 is clamped between the adjoining ends of the outer coupling members 12 and 14 of the two coupling assemblies.

From the foregoing description, it will be apparent that the particular illustrated embodiment of this invention provides a novel and advantageous coupling for resiliently transmitting torque between the two shafts 10 and 17.

While a presently-preferred embodiment of this invention has been shown in the accompanying drawing and described in detail herein, it is to be understood that the invention is susceptible of other structural embodiments differing from the particular arrangement shown. For example, the complete resilient coupling may be a single coupling assembly having only one outer coupling member, one coil spring annulus, and one inner coupling member, in place of the double coupling assembly shown. Also, for heavier torque loads, a coupling assembly may include two or more coil spring annuli spaced apart axially and both acting between the same inner coupling member and outer coupling member. In such case, the grooves in these members should be long enough to accommodate the two or more coil spring annuli and suitable means, such as snap rings, should be provided for preventing the coil spring annuli from becoming displaced longitudinally so as to interfere with one another. The coil spring may be of round or other cross-section differing from the preferred cross-section shown.

I claim:

1. A flexible coupling comprising a rotatable outer coupling member and a rotatable inner coupling member extending into said outer member, said outer member having a plurality of internal grooves spaced apart in succession circumferentially at the inside thereof, said inner member having a plurality of external grooves spaced apart in succession circumferentially at the outside thereof, and a coil spring annulus disposed between said outer and inner members and coupling them resiliently to one another, said coil spring annulus having interconnected helical turns received in said grooves in the outer and inner members, said coil spring being radially expanded at its inside turns, the inside turns of the coil spring annulus resiliently gripping the inner member radially and having a tight wedging fit in said grooves in the inner member.

2. A flexible coupling according to claim 1, wherein each external groove in the inner member has inclined opposite side walls which converge toward each other toward the bottom of the groove, and each turn of the coil spring has an oblong cross-section with a substantially greater thickness radially than axially, and each turn of the coil spring in cross-section has a progressively smaller axial thickness radially inward from a location intermediate its radially outward and inward edges for broad surface area contact with said side walls of the respective external groove in the inner member.

3. A flexible coupling comprising a rotatable outer coupling member and a rotatable inner coupling member extending into said outer member, said outer member having a plurality of internal grooves spaced apart in succession circumferentially at the inside thereof, said inner member having a plurality of external grooves spaced apart in succession circumferentially at the outside thereof, each of said internal and external grooves having inclined opposite side walls which converge toward each other toward the bottom of the groove, and a coil spring annulus disposed between said outer and inner members and coupling them resiliently to one another, said coil spring annulus having interconnected helical turns received in said grooves in the outer and inner members, the inside turns of the coil spring annulus resiliently gripping the inner member radially and having a tight wedging fit in said grooves in the inner member, each turn of the coil spring having an oblong cross-section with a substantially greater radial thickness than its maximum axial thickness, each turn of the coil spring in cross-section having its maximum axial thickness at a location intermediate its radially outward and inward edges and having a progressively smaller axial thickness on either side radially of said location.

References Cited by the Examiner

UNITED STATES PATENTS

| | | | |
|---|---|---|---|
| 1,185,209 | 5/1916 | Lapp | 64—15 |
| 2,096,039 | 10/1937 | Higgins | 64—15 |
| 2,737,033 | 3/1956 | Bendall | 64—9 X |
| 3,080,733 | 3/1963 | Crankshaw | 64—15 |

FOREIGN PATENTS

| | | |
|---|---|---|
| 1,252,227 | 12/1960 | France. |
| 22,605 | 1913 | Great Britain. |

FRED C. MATTERN, Jr., *Primary Examiner.*

HALL C. COE, *Examiner.*